United States Patent Office 3,759,905
Patented Sept. 18, 1973

3,759,905
7-[o-, m- AND p-(2' - AMINOETHOXY)PHENYL-ACETAMIDO] - 3 - (SUBSTITUTED METHYL)-CEPH-3-EM-4-CARBOXYLATES
Raymond Urgel Lemieux, Edmonton, Alberta, and Clinton Gordon Chin, Sherwood Park, Alberta, Canada, assignors to R & L Molecular Research Ltd., Edmonton, Alberta, Canada
No Drawing. Filed Oct. 14, 1971, Ser. No. 189,369
Int. Cl. C07d 99/24
U.S. Cl. 260—243 C       29 Claims

ABSTRACT OF THE DISCLOSURE

7-[o-, m- and p-(2'-aminoethoxy)phenylacetamido]-3-(substituted methyl)-ceph - 3-em-4-carboxylates, wherein the substituent on the "3-methyl" group is hydrogen, acetoxy, pyridinium, picolinium, lutidinium, 5-methyl-1,3,4 - thiadiazol - 2-ylthio, 1-methyl-5-tetrazolylthio or 3-methyl - 1,2,4-thiadiazol-5-ylthio and their zwitterions, betaines and nontoxic, pharmaceutically acceptable acid addition and cationic salts are valuable as antibacterial agents and as therapeutic agents in poultry and animals, including man, and are especially useful in the treatment of infectious diseases caused by many Gram-positive and Gram-negative bacteria. 7 - [p-(2'-aminoethoxy)-phenyl-acetamido] - 3-(pyridiniummethyl)ceph-3-em-4-carboxylate is prepared, for example, by treatment at 0° C. with trifluoroacetic acid of the corresponding compound in which the free amino group is protected with a tert.-butoxycarbonyl group.

BACKGROUND OF THE INVENTION (1) Field of the invention

The cephalosporins of the present invention possess the usual attributes of such compounds and are particularly useful in the treatment of bacterial infections.

(2) Description of the prior art

Cephalothin and cephaloridine are well-known antibacterial agents; see U.S. Pats. 3,218,318; 3,449,338 and 3,498,979. The patent literature also contains considerable data on cephaloglycin and cephalexin; see U.S. Pats. 3,303,193; 3,422,103; 3,364,212 and 3,507,861 and Great Britain 985,747; 1,054,806 and 1,174,335 and Belgium 696,026 (Farmdoc 29,494) and South Africa 67/1,260 (Farmdoc 28,654). Newer cephalosporins include cefazolin and cephapirin; see U.S. Pat. 3,516,997 [and also Netherlands 6805179 (Farmdoc 34,328) and South Africa 68/4,513] and U.S. Pat. 3,422,100.

The literature on cephalosporins has been reviewed, for example, by E. P. Abraham, Pharmacol. Rev. 14, 473–500 (1962), by I. M. Rollo, Ann. Rev. Pharmacol, 6, 218–221 (1966) by E. P. Abraham, Quart. Rev. (London), 21, 231 (1967), by E. Van. Heyningen, Advan. Drug Res., 4, 1–70 (1967), by G. T. Stewart, The Penicillin Group of Drugs, Elsevier Publishing Company, New York, N.Y. (1965) at pp. 185–192 and briefly in Annual Reports in Medicinal Chemistry, Academic Press, Inc., 111 5th Ave., New York, N.Y. 10003, by L. C. Cheney on pp. 96 and 97 (1967) and by K. Gerzon and R. B. Morin on pp. 90–93 (1968) and by K. Gerzon on pp. 78–80 (1969). New cephalosporins are frequently reported at the annular Interscience Conference on Antimicrobial Agents and Chemotherapy as illustrated by Sassiver et al., Antimicrobial Agents and Chemotherapy—1968, American Society for Microbiology, Bethesda, Md., pp. 101–114 (1969) and by Nishida et al., ibid., 236–243 (1970).

7-phenylacetamidocephalosporanic acid has also been named N-phenylacetyl derivative of 7-ACA, cephaloram, PACA and apparently phenasporin. Publications in the scientific literature on the preparation and/or properties of this compound, with or without substituents in the benzene ring, and corresponding compounds in which the 3-acetoxymethyl group has been replaced by methyl, hydroxymethyl and/or pyridiniummethyl include the following:

Chauvette, R. R., et al. "Chemistry of Cephalosporin Antibiotics, II. Preparation of a New Class of Antibiotics and the Relation of Structure to Activity," Journal of the American Chemical Society, 84, 3401–3402 (1962).
Chauvette, R. R., et al. "Structure-Activity Relationships Among 7 - Acylamidocephalosporanic Acids," Antimicrobial Agents and Chemotherapy—1962, 687–694.
Cocker, J. D., et al., "Cephalosporanic Acids. Part II. Displacement of the Acetoxy-Group by Nucleophiles," Journal of the Chemical Society, 5015–5013 (1965).
Cocker, J. D., et al., "Cephalosporanic Acids. Part IV. 7-Acylamidoceph-2-em-4-Carboxylic Acids," Journal of the Chemical Society, 1142–1151 (1966).
Culp, H. W., et al., "Metabolism and Absorption of 7-(Phenylacetamido-1-C$^{14}$)-Cephalosporanic Acid," Antimicrobial Agents and Chemotherapy—1963, 243–246.
Jago, M., "Antibacterial Activity of Some Derivatives of 7-Aminocephalosporanic Acid Against *Staphylococcus Aureus* and Synergism Between These and Other Antibiotics," Brit. J. Pharmacol., 22, 22–33 (1964).
Loder, B., et al., "The Cephalosporin C Nucleus (7-Aminocephalosporanic Acid) and Some of Its Derivatives," Biochemical Journal, 79, 408–416 (1961).
Nishida, M., et al., "Studies on Microbial Degradation of Cephalosporin C Derivatives II.," The Journal of Antibiotics, 21, 375–378 (1968).
Nishida, M., et al., "Studies of Microbial Degradation of Cephalosporin C Derivatives I.," The Journal of Antibiotics, 21, 165–169 (1968).
Spencer, J. L., et al., "Chemistry of Cephalosporin Antibiotics VIII. Synthesis and Structure-Activity Relationships of Cephaloridine Analogues," Antimicrobial Agents and Chemotherapy—1966, 573–580.
Stedman, R. J., et al., "7 - Aminodesacetoxycephalosporanic Acid and Its Derivatives," J. Med. Chem., 7 (1), 117–119 (1964).
Sullivan, H. R., et al., "Metabolism of Oral Cephalothin and Related Cephalosporins in the Rat," Biochemical Journal, 102, 976–982 (1967).
Vymola, F., et al., "The Classification and Characteristics of Cephalosporin Antibiotics I. Systematic Study of the Quantitative Sensitivity of Some Pathogenic Microorganisms to Cephaloridine," Journal of Hygiene, Epidemiology, Microbiology and Immunology, 10, 180–189 (1966).

Many other 7-acyl derivatives of 7-aminocephalosporanic acid have been reported in the patent literature including 7-[4-(α - aminoalkyl)phenylacetamido]cephalosporanic acids (U.S. Pat. 3,382,241), 7-[(p-aminophenylthio)acetamido]cephalosporanic acid (U.S. Pat. 3,422,-100), 7-(halophenylthioacetamido)cephalosporanic acids (U.S. Pat. 3,335,136) and the nearly unlimited number of variations of such compounds encompassed by the generic formulae (and often not otherwise described) of such patents as Netherlands 6902013 (Farmdoc 39,172). 7-(p-aminophenylacetamido)-cephalosporanic acid is disclosed in U.S. Pat. 3,422,103 as is the corresponding N-trityl derivative; see also Japan 2,712/67 (Farmdoc 25,-406).

U.S. Pat. 3,219,662 includes claims to compounds of the structure R—CH$_2$—CO—ACA in which R is phenyl, nitrophenyl (especially para-nitro), chlorophenyl, alkyl-phenyl and alkoxyphenyl and the corresponding phenoxy and substituted compoundss and for all of those the corresponding compounds in which the 3-acetoxymethyl group has been replaced by a 3-pyridiniummethyl group. A more extensive group of such compounds, including the series in which R is phenylthio and also the compounds in which R is benzyl [i.e., 7-(β-phenylpropionamido)cephalosporanic acid], alkoxybenzyl, alkanoyloxybenzyl, aminobenzyl, etc. are disclosed, at least generically, for use as starting materials in Great Britain 1,012,943 and 1,153,421 (Farmdoc 23,984) and see also Great Britain 1,001,478 and U.S. 3,280,118. Additional 7-phenylacetamidocephalosporanic acids having substituents on the benzene rings including hydroxy and amino are disclosed as starting materials in Great Britain 1,082,-943 and 1,082,962.

U.S. Pat. 3,341,531 describes the 7-(o-, m- and p - carboxamidomethylphenylacetamido)cephalosporanic acids and their betaines. A variety of 7-(halo-, dihalo-, nitro- and halonitro-phenylacetamido)cephalosporanic acids are named as starting materials for reaction with certain nucleophiles in U.S. Pat. 3,431,259 (Farmdoc 27,715). Additional 7-(phenylacetamido)cephalosporanic acids having various substituents on the benzene ring are disclosed in Japan 2,712/67 (Farmdoc 25,406), Japan 26,105/69 (Farmdoc 40,860), Great Britain 1,178,471 (Farmdoc 27,715, see Netherlands 6700906) and Japan 25,785/69 (Farmdoc 40,847).

U.S. Pat. 3,492,297 includes 7 - (p - guanidinophenylacetamido)cephalosporanic acid and its betaine.

In cephaloridine the 3-acetoxy group of cephalothin was replaced by a pyridinium group as described, for example, in U.S. Pats. 3,449,338 and 3,498,979.

The preparation of various 7-[α-amino-arylacetamido]-cephalosporanic acids and the corresponding desacetoxy compounds in which aryl represents unsubstituted or substituted phenyl or 2- or 3-thienyl is described, for example, in British specifications 985,747, 1,017,624, 1,054,-806 and 1,123,333, in Belgian Pat. 696,026 (Farmdoc No. 29,494), in U.S. Pats. 3,311,621, 3,352,858, 3,489,750, 3,489,751, 3,489,752 and 3,518,260, in Japanese Pat. 16,871/66 (Farmdoc 23,231), by Spencer et al., J. Med. Chem., 9 (5), 746–750 (1966) and by Kurita et al., J. Antibiotics (Tokyo) (A), 19, 243–249 (1966) and see also U.S. Pat. 3,485,819.

Netherlands Pats. 6811676 (Farmdoc 36,349) and 6812382 (Farmdoc 36,496) and U.S. Pats. 3,489,750 and 3,489,751 and 3,489,752 disclose ring-substituted cephaloglycins.

Various 7-[α-amino-arylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212 Belgian Pat. 675,-298 (Farmdoc 22,206), South African Pat. 67/1,260 (Farmdoc 28,654) and Belgian Pat. 696,026 (Farmdoc 29,494). Related compounds include those of U.S. Pats. 3,303,193 and 3,311,621 and 3,518,260.

Various cephalosporins, including cephalosporin C on occasion but not cephaloglycin, have been reacted with nucleophilic, aromatic mercaptans to produce compounds haivng the structure

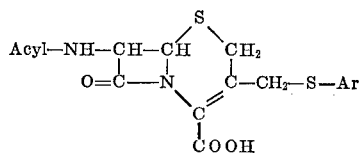

In U.S. Pat. 3,278,531 Ar is phenyl or certain substituted phenyls or certain aromatic heterocyclic rings named, for example, in col. 5. Similar nucleophiles, e.g. 2-mercapto-pyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for $R_3$. Additional nucleophiles of this type were disclosed by Fujisawa in Belgium 714,518 (Farmdoc 35,307; Netherlands 6806129 and South Africa 68/2,695), in Canada 818,501 (Farmdoc 38,845), in Great Britain 1,187,323 (Farmdoc 31,936; Netherlands 6714888), in U.S. 3,530,-123 and in U.S. 3,516,997 (Farmdoc 34,328; Netherlands 6805179) which includes the compound named cefazolin, which has a tetrazolyacetyl side chain on the 7-amino group and a 5-methyl-thiadiazolylthiomethyl group at the 3-position and is described at some length in the scientific literature, e.g. in Antimicrobial Agents and Chemotherapy—1969, American Society for Microbiology, Bethesda, Md. at pp. 236–243 and in J. Antibiotics (Japan), 23 (3), 131–148 (1970).

More recently, replacement of the 3-acetoxy group of a cephalosporin by various heterocyclic thiols has been disclosed in U.S. 3,563,983 and in Netherlands 7005519 (Farmdoc 80,188R) where the side chains were, for example, 7-α-aminophenylacetamido and typical heterocyclic thiols were 2-methyl-1,3,4-thiadiazole-5-thiol and 1-methyl-1,2,3,4-tetrazole-5-thiol.

Various cephalosporins having the structure

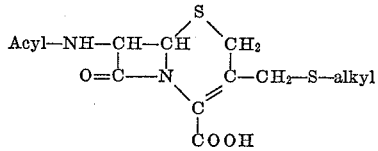

in which acyl represents various side chains including α-aminophenylacetyl have been described in some of the above and by Glaxo in Belgium 734,532 (Farmdoc 41,-619) and in Belguim 734,533 (Farmdoc 41,620).

Cephalosporins having the structure

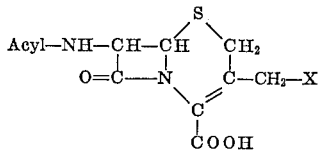

wherein X includes

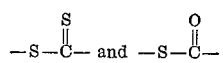

are disclosed in some of the above and in U.S. Pats. 3,329,-515, 3,239,516, 3,234,435, 3,258,461, 3,431,259 and 3,-446,803.

Related publications in the scientific literature include J. Med. Chem. 8, 174–181 (1965) and J. Chem. Soc. (London), 1595–1605 (1965), 5015–5031 (1965) and 1959–1963 (1967).

SUMMARY OF THE INVENTION

This invention comprises the compounds of the formula

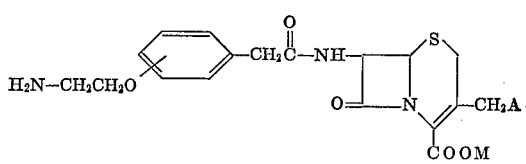

wherein A is hydrogen, acetoxy, 5-methyl-1,3,4-thiadiazol-2 - ylthio, 1 - methyl - 5 - tetrazolylthio, 3-methyl-1,2,4-thiadiazol-5-ylthio, pyridinium, picolinium or lutidinium; and M is hydrogen, a pharmaceutically acceptable, nontoxic cation or an anionic charge when A is one of said quaternary ammonium radicals.

Such salts include mineral acid addition salts such as the hydrochloride, hydrobromide, hydroiodide, sulfate, sulfamate and phosphate and organic acid addition salts such as the maleate, acetate, citrate, oxalate, succinate, benzoate, tartrate, fumarate, malate, mandelate, ascorbate, trifluoroacetate and the like.

The compounds of the present invention are prepared by coupling with 7-aminocephalosporanic acid (or a salt or easily hydrolyzed ester thereof including those of U.S. Pat. 3,284,451 and any of the silyl esters described in U.S. Pat. 3,249,622 for use with 7-aminopenicillanic acid and used in Great Britain 1,073,530) or a corresponding derivative of 7-aminocephalosporanic acid in which the acetoxy group has been replaced by a thiol, e.g. 7-amino-3 - [(1 - methyl - 5 - tetrazolylthio)methyl]-ceph-3-em-4-carboxylic acid, a particular acid or its functional equivalent as an acylating agent for a primary amino group. Said acid has the formula

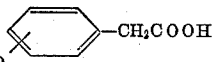

wherein B represents a blocking group of the type used either in peptide syntheses or in any of the numerous syntheses of α-aminobenzylpenicillin from 2 - phenylglycine. Particularly valuable blocking groups are a proton, as in the compound of the formula

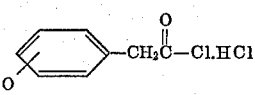

or a β-diketone as in Great Britain 1,123,333, e.g. methyl acetoacetate, in which case the acid containing the blocked amino group is preferably converted to a mixed anhydride, as with ethyl chloroformate, before reaction with 7-aminocephalosporanic acid or a salt thereof to form a 7-[α'-aminoethoxyphenylacetamido]cephalosporanic acid with the amino group blocked.

The 3-acetoxy group is replaced, if desired, by the 3-pyridiniummethyl group by the use of a procedure described by Glaxo Laboratories Ltd. in Netherlands Pat. 6408066. Thus when the blocking group is tert.-butoxycarbonyl the acetoxy group in potassium 7-[p-(2'-tert.-butoxycarbonylaminoethoxy)phenylacetamido] cephalosporanate is first replaced with thiopicolinic acid which is in turn replaced by pyridine by reaction with a mercuric perchlorate-pyridine complex after which the blocking group is removed.

REACTION SCHEMES

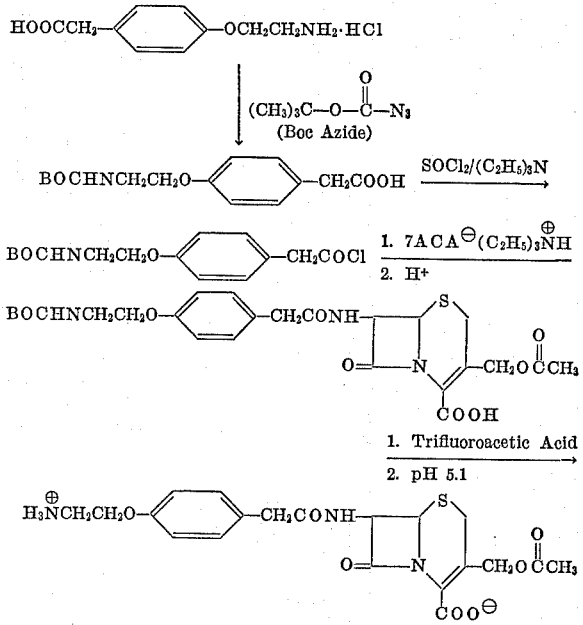

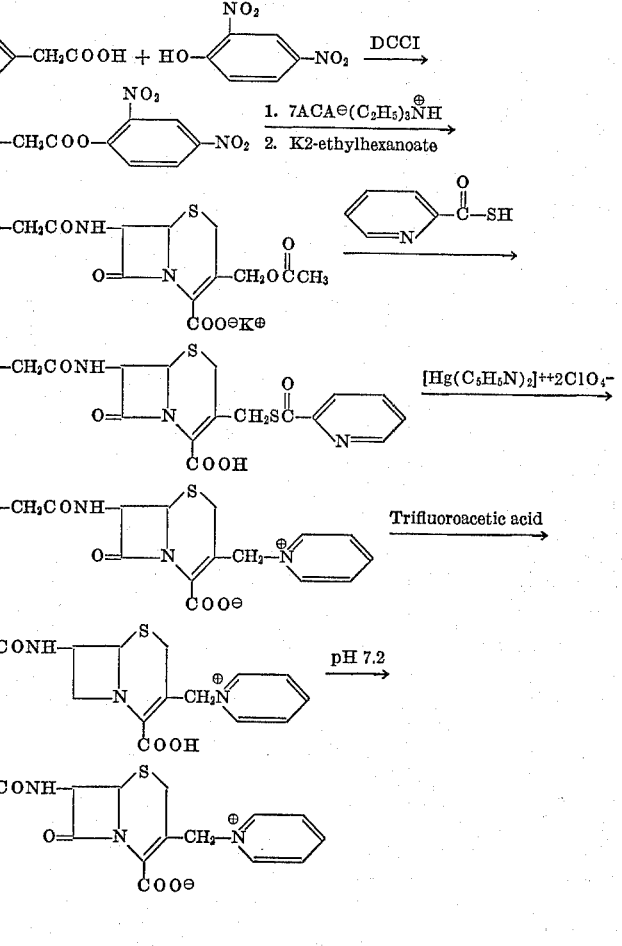

$$*BOC \equiv (CH_3)_3C-O-\overset{O}{\underset{\|}{C}}-$$

Further to the discussion above of blocking groups used on the free amine group of the side chain during its coupling with 7-aminocephalosporanic acid, the blocking group is then removed to form the products of the present invention, e.g. the t-butoxy-carbonyl group is removed by treatment with formic acid or trifluoroacetic acid, the carbobenzyloxy group is removed by catalytic hydrogenation, the 2 - hydroxy - 1 - naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with 7-aminocephalosporanic acid, functional equivalents include the corresponding acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with 7-aminocephalosporanic acid after first reacting said free acid with N,N'-dimethylchloroforminium chloride [cf. Great Britain 1,008,170 and Novak and Weichet, Experientia XXI, 360 (1965)] or by the use of enzymes or of an N,N'-carbonyldiimidazole or an N,N'-carbonylditriazole [cf. South African patent specification 63/2,684] or a carbodiimide reagent [especially N,N'-dicyclohexylcarbodiimide, N,N'-diisopropylcarbodiimide or N-cyclohexyl-N' - (2-morpholinoethyl)carbodiimide; cf. Sheehan and Hess, J. Amer. Chem. Soc. 77, 1067 (1955)], or of alkynylamine reagent [cf. R. Buijle and H. G. Viehe, Angew. Chem. International Edition 3, 582 (1964)], or of a ketenimine reagent [ct. C. L. Stevens and M. E. Mond, J. Amer. Chem. Soc., 80, 4065] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylfomamide or a similar inert solvent to form the caboxylic acid imidazolide in practically quantitative yield with liberation of carbon dioxide and one mole of imidazole. Dicarboxylic acids yield diimidazolide. The byproduct, imidazole, precipitates and may be separated and the imidazolide isolated, but this is not essential. The methods for carrying out these reactions to produce a cephalosporin and the methods used to isolate the cephalosporin so-produced are well-known in the art.

In the treatment of bacterial infections in man, the compounds of this invention are administered parenterally in accordance with conventional procedures for antibiotic administration, in an amount of from about 5 to 200 mg./kg./day and preferably about 5–20 mg./kg./day in divided dosage, e.g., three to four times a day. They are administered in dosage units containing, for example, 125, 250 or 500 mg. of active ingredient with suitable physiologically acceptable carriers or excipients. The dosage units are in the form of liquid preparations such as solutions or suspensions.

The following examples are given in illustration of, but not in limitation of, the present invention. All temperatures are in degrees centigrade. "Hour" and "hours" are abbreviated as "h.". "Skellysolve B" is a petroleum ether fraction of B.P. 60–68° C. consisting essentially of n-hexane.

DESCRIPTION OF THE PREFERRED EMBODIMENTS

Example 1

Methyl p - hydroxyphenylacetate (I).—p-Hydroxyphenylacetic acid (208.5 g., 1.37 moles), conc. sulphuric acid (sp. g. 1.84, 50 ml.), and methanol (1000 ml.) were refluxed for 6 h. The reaction mixture was concentrated under reduced pressure and the residue was poured into a stirred mixture of ice-water (1 l.) and ether (1 l.). The ether layer was washed successively with cold water (until the washings were almost neutral), 10% aqueous sodium bicarbonate and saturated brine and then dried ($MgSO_4$) and concentrated. Distillation gave a colorless, viscous, liquid 195.4 g. (85.5%) B.P. 134–136°/0.3 mm., which could be crystallized to give methyl p-hydroxyphenylacetate as a white solid M.P. 55–56°. The infrared (IR) spectrum (film) had bands $\gamma_{max.}^{film}$ at 3400 and 1720 cm.$^{-1}$, the NMR spectrum ($CDCl_3$): τ 6.47 (singlet, 2H), 6.33 (singlet, 3H), 3.60 (broad singlet, 1H), 3.30 (doublet, 2H, J=8 cps.) and 2.90 (doublet, 2H, J=8 cps.).

Methyl p-cyanomethoxyphenylacetate (II).—A mixture of chloroacetonitrile (151 g., 2 moles), potassium iodide (8 g.), and methyl ethyl ketone (200 ml.) was set aside in the dark overnight, then was added over 1.25 h. to a stirred, refluxing mixture of methyl p-hydroxyphenylacetate (I, 99.6 g., 0.6 mole), anhydrous potassium carbonate (82.8 g., 0.6 mole), and methyl ethyl ketone (300 ml.), and the mixture was refluxed for 6 h., then allowed to stand overnight. The mixture was concentrated, and the residue in ether was washed successively with water, 10% aqueous sodium thiosulphate, 5% cold aqueous sodium hydroxide, water and saturated brine and then dried ($MgSO_4$) and concentrated. Distillation gave a forerun of chloroacetonitrile (25 g.), followed by a yellow liquid (98.8 g., 80%) B.P. 153–160°/3 mm. Redistillation gave the desired methyl p-cyanomethoxyphenylacetate, 94.4 g. (77%) B.P. 140–144°/0.05 mm.;

$\gamma_{max.}^{film}$ 1730 cm.$^{-1}$

NMR ($CDCl_3$): τ 6.42 (singlet, 2H), 6.32 (singlet, 3H), 5.27 (singlet, 2H), 2.6–3.2 (multiplet, 4H).

p-(2'-aminoethoxy)phenylacetic acid (IIIb).—Methyl p-cyanomethoxyphenyl acetate (II, 20.5 g., 0.1 mole) and dry hydrogen chloride (0.12 mole) in methanol (172 ml.) was hydrogenated over platinum ($PtO_2$, 2 g.) under pressure (initial pressure 55 p.s.i. falling to 34 p.s.i.) for 19 h. Filtration through diatomaceous earth ("Celite") and concentration of the filtrate gave a solid which was triturated with ether. The insoluble material (11 g.) and 6 N hydrochloric acid (130 ml.) were refluxed for 3 h., then the mixture was concentrated and the solution of the residue in water (50 ml.) was extracted with ethyl acetate. The aqueous solution (pH <1) was made alkaline (pH 8.3) with 1 N NaOH (60 ml.), then concentrated. Addition of cold water to the residue and filtration gave p-(2'-aminoethoxy)phenylacetic acid as a tan solid, 2.7 g. (13.8%) M.P. 225° (dec.);

$\gamma_{max.}^{Nujol}$: 1610 and 1550 cm.$^{-1}$

NMR ($D_2O$/trifluoroacetic acid): τ 6.5–6.9 (multiplet, 2H), 6.45 (singlet, 2H), 5.7–6.0 (multiplet, 4H), and 2.6–3.2 (multiplet, 4H).

p-(2'-aminoethoxy)phenylacetic acid hydrochloride (IIIa).—The cyanomethoxy ester (II, 28.5 g., 0.139 mole) in dry tetrahydrofuran (180 ml.) was treated over 45 min. with diborane in tetrahydrofuran (139 ml. of a 0.5 M solution). The temperature of the reaction mixture was maintained between 12–19° during the addition, and the mixture was stirred at room temperature for an additional hour. After decomposing excess diborane with methanol, the reaction mixture was treated with a stream of dry hydrogen chloride until the mixture was acidic (a white solid separated). Evaporation of volatile materials and trituration of the residue with ether gave an amorphous solid, 24.2 g. (71.5%), whose IR spectrum had a band at 1720 cm.$^{-1}$ ascribed to the ester carbonyl. The aminoester hydrochloride (16.6 g., 0.067 mole) and 2 N HCl were refluxed for 2 h. then set aside at room temperature overnight. The mixture was then contracted, the residue treated with ether and filtered to give p-(2'-aminoethoxy)phenylacetic acid hydrochloride as an amorphous solid 13.2 g. (85%);

$\gamma_{max.}^{Nujol}$: 1690 cm.$^{-1}$

NMR (D$_2$O): $\tau$ 6.63 (triplet, 2H, J=5 cps.), 6.45 (singlet, 2H), 5.80 (triplet, 2H, J=5 cps.), and 2.6–3.2 (multiplet, 4H).

p - (2' - N - tert.-butoxycarbonylaminoethoxy)phenylacetic acid (IV).—(a) From the amino acid hydrochloride (IIIa): A solution of the amino acid hydrochloride (13.2 g., 0.057 mole) and triethylamine (24 g., 0.24 mole) in water (150 ml.) was cooled to 0° then treated with tert.-butoxycarbonylazide (11.0 g., 0.077 mole) in tetrahydrofuran (90 ml.), and the mixture stirred for 20 h. (after 15 h., solution was about pH 7, so more triethylamine (5 ml.) was added), then heated at 45° for 1.5 hours. Concentration gave an aqueous residue, which was first extracted with ether, then layered with ethyl acetate and acidified with 3 N HCl to pH 2.5 while being cooled and stirred. The aqueous layer was further extracted with ethyl acetate, and the combined organic portions dried (MgSO$_4$) and concentrated. Addition of hexane and filtration gave p-(2'-N-tert.-butoxycarbonylaminoethoxy)phenylacetic acid as a white solid 7.5 g. (45%) M.P. 100–103°. The IR spectrum was super-imposable on that of the compound prepared from the amino acid according to the procedure described below.

(b) From the amino acid (IIIb).—The amino acid (1.95 g., 0.01 mole), tert.-butyl 2,4,5-trichlorophenyl carbonate (3.6 g., 0.012 mole), triethylamine (2.5 g., 0.025 mole), and water-tert.-butanol (12 ml.–18 ml.) were heated at 60–65° for 2 h. The mixture was concentrated, and the turbid aqueous residue was extracted with ethyl acetate. The now clear aqueous portion was layered with ethyl acetate, cooled in an ice-water mixture, stirred and acidified to pH 1. The aqueous part was further extracted with ethyl acetate, and the combined organic extracts back-extracted with excess aqueous sodium bicarbonate (2 g., .024 mole, 30 ml. H$_2$O). The BOC amino acid was reisolated by layering the alkaline solution with ethyl acetate, cooling and acidifying with 6 N HCl. Drying (MgSO$_4$) and concentration of the organic portions gave p-(2'-N-tert.-butoxycarbonylaminoethoxy)phenylacetic acid as a white solid, 1.5 g. (50%), M.P. 105–108°;

$\gamma_{max.}^{Nujol}$: 3300, 1720, and 1650 cm.$^{-1}$

NMR (CDCl$_3$): $\tau$ 8.56 (singlet, 9H), 6.45 (singlet) and 6.3–6.7 (multiplet [total 4H]), 6.03 (triplet, 2H, J=5 cps.), 2.7–3.3 (multiplet, 4H), −1.35 (singlet, 1H), and 4.8 (broad singlet, 1H). The last two signals disappeared when the sample was shaken with D$_2$O and the spectrum rerun.

BOC amino acid chloride (V).—To a cold solution of the BOC amino acid IV (1.15 g., 0.004 mole) and triethylamine (0.404 g., 0.004 mole) in dry methylene chloride (5 ml.) was added thionyl chloride (0.475 g., 0.004 mole) in methylene chloride. After 1 h. at 5° (an IR spectrum of the crude mixture indicated the absence of any carboxylate band and the presence of a new band at 1770 cm.$^{-1}$), the solution was partially evaporated and the residue was used in the next step.

7 - [p - (2' - N - tert.-butoxycarbonylaminoethoxy) phenylacetamido]-cephalosporanic acid (VI).—The BOC amino acid chloride from the previous experiment was added to a cold solution of 7-aminocephalosporanic acid (1.1 g., 4.05 mmoles) and triethylamine (0.9 g., 8.9 mmoles) in methylene chloride (50 ml.). The reaction mixture was left at room temperature for 40 min. longer, then concentrated, and the residue treated with water (50 ml.). The resulting turbid mixture was extracted with ether, and the now homogeneous aqueous portion was cooled, layered with ether then acidified to pH 2. The aqueous portion was further extracted with ethyl acetate and the combined organic portions dried (MgSO$_4$) and concentrated to give 7-[p-(2'-N-tert.-butoxycarbonylaminoethoxy)phenylacetamido]-cephalosporanic acid as a yellow foam, 1.4 g. (64%);

$\gamma_{max.}^{film}$: 1770 and 1700 cm.$^{-1}$

7-[p - (2' - aminoethoxy)phenylacetamido]cephalosporanic acid.—The cephalosporanic acid (VI, 1.4 g.) was dissolved in cold trifluoroacetic acid (10 ml.) and the solution maintained at 0–5° for 1 h. Addition of ether and filtration gave the trifluoroacetate salt of the title compound as a yellow solid 1.15 g. (82%);

$\gamma_{max.}^{Nujol}$: 1770, 1710 and 1660 cm.$^{-1}$

The NMR spectrum was in agreement with the assigned structure, and indicated a purity of 75–80%. The trifluoroacetate salt (1.3 g.) of the title compound was treated with water (15 ml.), filtered, and the filtrate (pH 1.6) was adjusted to pH 5.1 with 1 N NaOH. Partial concentration and freeze-drying gave a solid (1.2 g.), which was washed with cold water. The undissolved material was dried, yielding 7-[p-(2'-aminoethoxy)phenylacetamido]cephalosporanic acid as a tan solid, 0.5 g. (48%);

$\gamma_{max.}^{Nujol}$: 3250, 1750 cm.$^{-1}$

The NMR spectrum (D$_2$O-trifluoroacetic acid) was in agreement with the assigned structure, and indicated a purity of about 90%.

EXAMPLE 2

2,4-dinitrophenyl p-(2'-N-tert.-butoxycarbonylaminoethoxy)-phenylacetate (VIII).—N,N'-dicyclohexylcarbodiimide (6.7 g., 0.0325 mole) was added to a solution of the BOC amino acid (p-(2'-N-tert.-butoxycarbonylaminoethoxy)phenylacetic acid, 9.6 g., 0.0325 mole) and 2,4-dinitrophenol (6.0 g., 0.0325 mole) in anhydrous tetrahydrofuran (75 ml.), cooled to 0°. The reaction mixture was left at room temperature for 4 h. The precipitated N,N'-dicyclohexylurea was filtered off, and the filtrate concentrated to give a quantitative yield of the title compound as a yellow oil. The infrared spectrum (film)

($\gamma_{max.}^{film}$)

had characteristic bands at 3400, 1790, 1710, 1610, 1540 and 1510 cm.$^{-1}$.

Potassium 7-[p-(2' - N - tert.-butoxycarbonylaminoethoxy)phenylacetamido]-cephalosporanate (IX).—The protected activated ester (VIII, 0.0325 mole) in methylene chloride (25 ml.) was added to a cold solution of 7-aminocephalosporanic acid (8.85 g., 0.0325 mole) and triethylamine (7.0 g., 0.07 mole) in methylene chloride (55 ml.). The reaction mixture was stirred at room temperature overnight. Some insoluble material was filtered off, and the filtrate was diluted with ether (450 ml.). The precipitated gum was twice redissolved in methylene chloride and reprecipitated with ether, then treated with methanol (50 ml.). Some insoluble material was filtered off, and the filtrate was treated with 13.7 ml. of a 2.3 M solution of potassium 2-ethylhexanoate in n-butyl alcohol, followed by addition of ether (300 ml.). The yellow solid was collected, further purified by dissolving in methanol (200 ml.) and reprecipitating with ether (500 ml.). Filtration and drying gave 12.6 g. (66%) of the title compound;

$\gamma_{max.}^{Nujol}$: 3300, 1770, 1740 (shoulder), 1680, 1660, and 1610, cm.$^{-1}$ 7 - [p - (2' - N - tert. - butoxycarbonylaminoethoxy) phenylacetamido]-3-(picolinoylthiomethyl)ceph - 3 - em- 4-carboxylic acid (X).—The cephalosporanate (IX, 7.6 g., 0.013 mole) was added in portions to a stirred solution of thiopicolinic acid in water at 70–75°. The reaction mixture was kept at the same temperature for 1 h., then cooled to 40° (filtration was tedious at room temperature) and the solid collected by filtration. The yellow-brown material was treated with acetone (135 ml.), filtered and the filtrate was diluted with water (35 ml.). The mixture was cooled in ice, acidified to pH 2 with concentrated hydrochloric acid, then poured into 350 ml. of cold water. Decantation left a gum, which solidified on trituration with water. Filtration gave a solid which was dissolved in methylene chloride, and the solution dried (MgSO₄), then concentrated, yielding 7-[p-(2'-N-tert. - butoxycarbonylaminoethoxy)phenylacetamido]-3-(picolinoylthiomethyl)ceph-3-em-4-carboxylic acid as a brown solid, 5.5 g. (67%);

$\gamma_{max.}^{Nujol}$: 3300, 1770, 1710, and 1670 cm.⁻¹

7 - [p-(2'-N-tert.-butoxycarbonylaminoethoxy)phenylacetamido] - 3 - (pyridiniummethyl)ceph - 3-em-4-carboxylate (XI).—A solution of the picolinoylthiomethyl cephalosporin (X, 5.5 g. 0.0088 mole) in pyridine (40 ml.) was diluted with water (40 ml.), then treated with a solution of the mercuric perchloratepyridine complex (12.3 g., 0.022 mole) in pyridine-water (40 ml.–40 ml.) added at room temperature over five minutes. The reaction mixture was stirred at room temperature for 1 h., then a rapid stream of hydrogen sulfide was bubbled through the mixture for 5 min. The mixture was filtered through "Celite" and the filtrate washed successively with benzene (125 ml.), then twice with a 1:2 mixture of Amberlite LA–1 liquid ion-exchange resin and benzene (200 and 100 ml.) and benzene (100 ml.). The turbid aqueous solution was again filtered through "Celite" and the filtrate was concentrated, then dried, giving 7-[p-(2'-N-tert. - butoxycarbonylaminoethoxy)phenylacetamido]-3-(pyridiummethyl)ceph-3-em-4-carboxylate as a brown amorphous solid 3.6 g. (72%);

$\gamma_{max}^{Nujol}$ 1770, 1680 (broad) and 1620 cm.⁻¹

7 - [p - (2' - aminoethoxy)phenylacetamido]-3-(pyridiniummethyl)ceph - 3 - em - 4-carboxylate di(trifluoroactate) (XII).—The BOC-protected cephalosporin (XI, 3.6 g., 0.0063 mole) was treated with trifluoroacetic acid at 0° for 1 hour. Addition of dry ether precipitated 7-[p-(2' - aminoethoxy)phenylacetamido] - 3 - (pyridiniummethyl)ceph-3-em-4-carboxylate di(trifluoroacetate) as a solid, 2.6 g. (59%);

$\gamma_{max.}^{Nujol}$: 1770, 1670 and 1620 cm.⁻¹

7 - [p - (2'-aminoethoxy)phenylacetamido]-3-(pyridiniummethyl)ceph - 3 - em-4-carboxylate.—The di(trifluoroacetate) salt (XII, 2.6 g., 0.0037 mole) was treated with water (45 ml.), filtered through "Celite," and the filtrate adjusted to pH 7.2 with dilute ammonium hydroxide. Concentration gave a brown foam, which was extracted with methanol (2× 40 ml., 1× 15 ml.). The combined methanolic extracts were filtered, and addition of dry ether to the filtrate precipitated 7-[p-(2'-aminoethoxy)phenylacetamido] - 3-(pyridiniummethyl)cept-3-em-4-carboxylate as an off-white solid, 1.52 g. (86%);

$\gamma_{max.}^{Nujol}$: 1770, 1660 and 1600 cm.⁻¹

The NMR spectrum (D₂O) was in agreement with the assigned structure, and indicated a purity of about 90%.

"Amberlite LA–1" resin is a mixture of secondary amines wherein each secondary amine has the formula

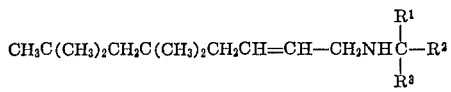

wherein each of R¹, R² and R³ is an aliphatic hydrocarbon radical and wherein R¹, R² and R³ contain in the aggregate from 11 to 14 carbon atoms; this particular mixture of secondary amines, which is sometimes referred to as "Liquid Amine Mixture No. I," is a clear amber liquid having the following physical characteristics: viscosity at 25° C. of 70 cps.; specific gravity at 20° C. of 0.845; refractive index at 25° C. of 1.467; distillation range at 10 mm.: up to 160° C.—74%, above 220° C.—17%.

Cephalosporin derivatives of o-, m-, and p- (2'-aminoethoxy)-phenylacetic acids.—The title compounds were prepared from the N-tert.-butoxycarbonyl (BOC)-protected amino-acids and 7-amino-cephalosporanic acid (7-ACA) and its derivatives (except in the case of m-[(2'-aminoethoxy)phenylacetamido]cephalosporanic acid, which was prepared from the corresponding azido-compound) followed by removal of the BOC-group with cold trifluoroacetic acid.

This report is divided into three sections:

Section A—The syntheses of these amino-acids (and azido acids) and their protection.

Section B—The coupling of the protected amino-acids (and m-azido-acid) with 7-ACA and its derivatives modified in the 3-position.

Section C—The preparation of 3-pyridiniummethyl-ceph-3-em derivatives.

SECTION A o, m, and p-(2'-N-tert.-butoxycarbonylaminoethoxy) phenylacetic acids

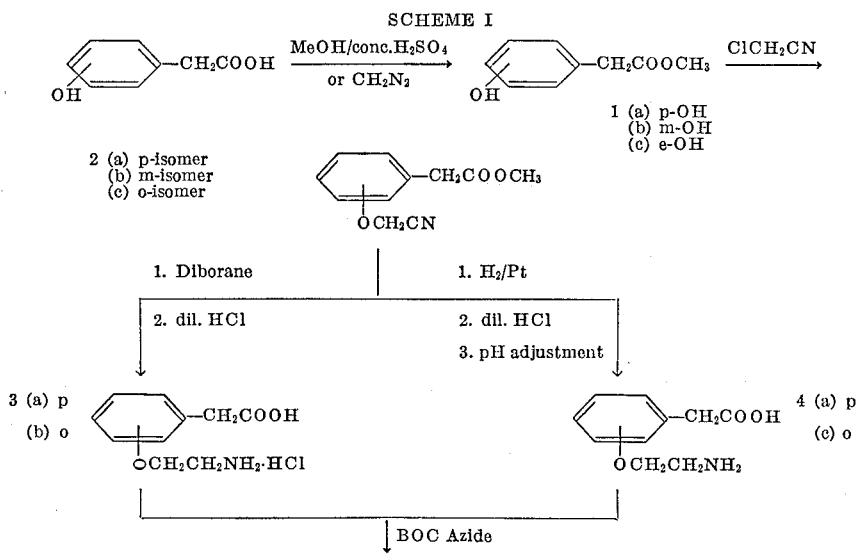

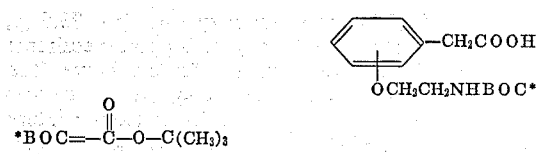

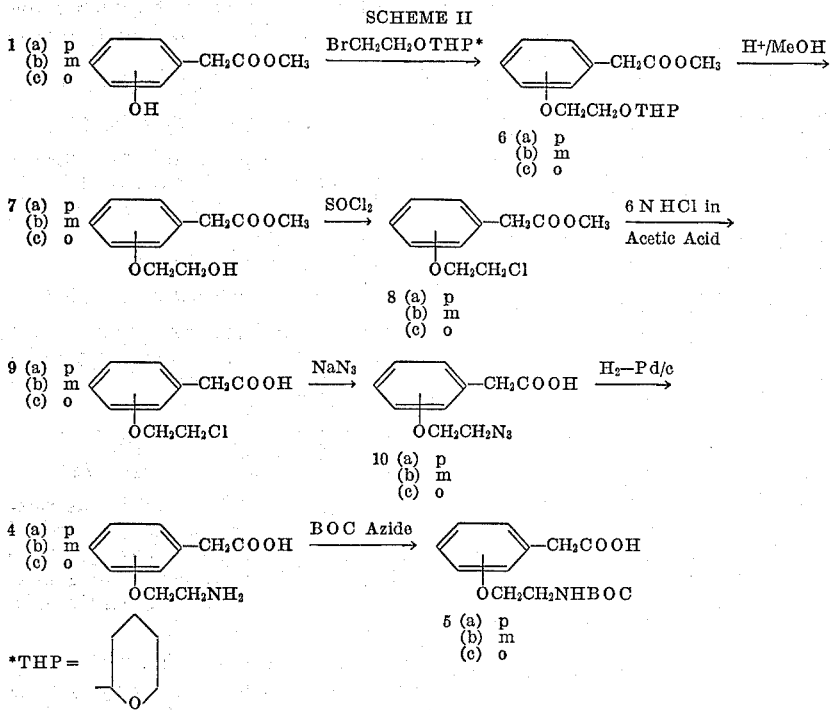

Two routes were tried and these are outlined in Schemes I and II. Although the former appears more attractive in that fewer steps are involved, the diborane reduction of the cyanomethoxyester gave variable results, and this route was abandoned in favor of the route depicted in Scheme II. This latter route involved more steps, but the yields obtained in each stage are generally good and reproducible.

SCHEME I

Methyl p-hydroxyphenylacetate (1a)

See Example 1.

Methyl m-hydroxyphenylacetate (1b)

The title compound was prepared from the corresponding acid and (a) diazomethane in 98% yield, B.P. 120–123°/0.09 mm., (b) methanol/concentrated sulphuric acid in 87.5% yield, B.P. 126°/0.1 mm.;

$\gamma_{max.}^{film}$: 3400, 1720 and 1590 cm.$^{-1}$

NMR (CCl$_4$): $\tau$ 6.55 (singlet, 2H), 6.40 (singlet, 3H), and 2.7–3.5 (multiplet, 4H).

Methyl o-hydroxyphenylacetate (1c)

The title compound was prepared from the corresponding acid and (a) diazomethane in 98% yield, B.P. 97–108°/0.07 mm., (b) methanol/concentrated sulphuric acid at 20° in 93% yield, M.P. 71–74°;

$\gamma_{max.}^{Nujol}$: 3450, 1720 and 1600 cm.$^{-1}$

NMR (CDCl$_3$): $\tau$ 6.32 (singlet, 2H), 6.28 (singlet, 3H), and 2.6–3.3 (multiplet, 4H).

Methyl p-cyanomethoxyphenylacetate (2a)

See Example 1.

Methyl m-cyanomethoxyphenylacetate (2b)

The reaction of methyl m-hydroxyphenylacetate (5.0 g., 0.03 mole), potassium carbonate (4.2 g., 0.03 mole), chloroacetonitrile (4.6 g., 0.06 mole), and potassium iodide (0.15 g.) in methylethyl ketone (30 ml.) gave after distillation, 5.5 g. (90%) B.P. 129–134°/0.07 mm., $\gamma_{max.}^{film}$: 1750 and 1590 cm.$^{-1}$ NMR (CCl$_4$): $\tau$ 6.50 (singlet, 2H), 6.42 (singlet, 3H), 5.43 (singlet, 2H), and 2.6–3.4 (multiplet, 4H).

Methyl o-cyanomethoxyphenylacetate (2c)

Methyl o-hydroxyphenylacetate (1c, 8.3 g., 0.05 mole) in dry dimethylformamide (DMF, 20 ml.) was added dropwise to a stirred slurry of sodium hydride (2.5 g., 56% in oil, hexane washed, 0.058 mole) in DMF (80 ml.) at 0°. Chloroacetonitrile (7.55 g., 0.1 mole) in DMF (20 ml.) was then added at 0–5°, and the mixture was stirred at room temperature for 3 days.

The reaction mixture was concentrated, and the residue partitioned between ether and water. The ether portion was washed with cold 0.5 N aqueous sodium hydroxide, saturated brine, dried (MgSO$_4$) then concentrated yielding 8.65 g. (84%) of a mobile liquid. Distillation gave 6.8 g. (66%), B.P. 143–144°/0.08 mm.;

$\gamma_{max.}^{film}$: 1740 cm.$^{-1}$

NMR (CCl$_4$): $\tau$ 6.45 (singlet, 2H), 6.37 (singlet, 3H), 5.38 (singlet, 2H), and 2.6–3.3 (multiplet, 4H).

p-(2′-aminoethoxy)phenylacetic acid (4a)

See Example 1.

p-(2′-aminoethoxy)phenylacetic acid hydrochloride (3a)

See Example 1.

o-(2'-aminoethoxy)phenylacetic acid hydrochloride (3b)

The cyanomethoxy ester (2c, 5.6 g., 27.3 mmoles) in dry tetrahydrofuran (50 ml.) was treated at 15–20° with diborane in tetrahydrofuran (30 ml. of a solution 1 M in $BH_3$). After stirring at room temperature for 1.5 h. excess diborane was decomposed with methanol, and the mixture was treated with a stream of dry hydrogen chloride until the mixture was acidic. Evaporation of volatile materials and trituration of the residue with ether gave a gum, which was treated with 3 N HCl (60 ml.). The turbid mixture was extracted with ethyl acetate (discarded) and the aqueous portion was set aside at room temperature overnight. Concentration and trituration with ether gave a hygroscopic, amorphous powder (4.2 g.) which contained ca. 30% of the desired product (NMR and IR analysis).

o-(2'-aminoethoxy)phenylacetic acid (4c)

The crude amino-acid hydrochloride (3b, from reduction of 9.2 g. of methyl o-cyanomethoxyphenylacetate with diborane, followed by acid hydrolysis of the product) was dissolved in water (50 ml.) and stirred with silver oxide (10 g.) for 2 hours. The solids were removed by filtration through "Celite" and the filtrate was treated with hydrogen sulfide. Filtration, followed by concentration and lyophilization of the filtrate gave a gum, which solidified on trituration with acetone. Filtration gave an amorphous solid, 0.9 g. (10% from 2c);

$\gamma_{max.}^{Nujol}$: 1550 cm.$^{-1}$

NMR ($D_2O$): $\tau$ 6.52, 6.5–6.8 (singlet and multiplet respectively, total 4H), 5.6–5.9 (multiplet, 2H), and 2.6–3.2 (multiplet, 4H), NMR (trifluoroacetic acid): $\tau$ 6.13, 6.1–6.5 (singlet and multiplet respectively, total 4H), 5.4–5.8 (multiplet, 2H), and 2.4–3.3 (multiplet, 7H).

SCHEME II

Methyl p-(2'-tetrahydropyranyloxyethoxy)phenylacetate (6a)

To the sodium salt of methyl p-hydroxyphenylacetate [prepared by addition of the hydroxy-ester (1a, 49.8 g., 0.3 mole) in DMF (125 ml.) to a slurry of hexane-washed sodium hydride (13.3 g., 56% in oil, 0.31 mole) in DMF (300 ml.) at 5–10°], at 10°, was added the tetrahydropyranyl (THP)-protected bromoethanol (64.8 g., 0.31 mole) in DMF (75 ml.). The reaction mixture was stirred at room temperature for 1 hour, then heated at 50° for 20 hours. The mixture was concentrated, the residue treated with water (200 ml.), and the aqueous mixture was extracted with ether (2× 200 ml.). The combined ether portions were washed with cold 1 N aqueous NaOH (2× 100 ml.), followed by saturated brine, then dried ($MgSO_4$/C) and concentrated to give a viscous liquid, 73.5 g. (83%);

$\gamma_{max.}^{film}$: 1740, 1640 and 1510 cm.$^{-1}$

Methyl m-(2'-tetrahydropyranyloxyethoxy)phenylacetate (6b)

Methyl m-hydroxyphenylacetate (36.8 g., 0.222 mole), sodium hydride (10.0 g., 56% in oil, 0.233 mole), and the THP-protected bromo-ethanol (48.7 g., 0.233 mole) were reacted as for the p-isomer. Work-up gave a pale yellow oil, 58.9 g. (90%);

$\gamma_{max.}^{film}$: 1745, 1605 and 1585 cm.$^{-1}$

Methyl o-(2'-tetrahydropyranyloxyethoxy)phenylacetate (6c)

Methyl o-hydroxyphenylacetate (58.6 g., 0.354 mole), sodium hydride (15.9 g., 56% in oil, 0.37 mole), and the THP-protected bromoethanol (77.4 g., 0.37 mole) were reacted as for the p- and m-isomers. Work-up gave a dark-red oil, 93.7 g. (90%);

$\gamma_{max.}^{film}$: 1740, 1600 and 1590 cm.$^{-1}$

Methyl p-(2'-hydroxyethoxy)phenylacetate (7a)

The crude THP-protected hydroxy-ester (6a, 73.5 g., 0.25 mole), methanol (400 ml.) and p-toluenesulfonic acid (TsOH) (2 g.) were refluxed for 1.5 hours. The reaction mixture was then concentrated, the residue was treated with water (100 ml.), and the aqueous mixture was extracted with ethyl acetate. The ethyl acetate solution was washed with 10% aqueous sodium bicarbonate, followed by saturated brine, then dried ($MgSO_4$/C) and concentrated to give a quantitative yield of a viscous amber liquid;

$\gamma_{max.}^{film}$: 3400, 1730, 1610, 1580, and 1500 cm.$^{-1}$

Methyl m-(2'-hydroxyethoxy)phenylacetate (7b)

Reaction of the crude THP-protected hydroxyester (6b, 58.9 g., 0.2 mole), methanol (250 ml.), and p-TsOH (1 g.) as for the p-isomer (7a) gave a quantitative yield of the crude hydroxy-ester (7b);

$\gamma_{max.}^{film}$: 3400, 1740 and 1600 cm.$^{-1}$

Methyl o-(2'-hydroxyethoxy)phenylacetate (7c)

Reaction of the crude THP-protected hydroxy-ester (6c, 93.7 g., 0.32 mole), methanol (600 ml.), and p-TsOH (3 g.) as for the p- and m-isomers gave the crude hydroxyester as a dark-red oil, 65.5 g. (97.5%);

$\gamma_{max.}^{film}$: 3400, 1730, 1600 and 1560 cm.$^{-1}$

Methyl p-(2'-chloroethoxy)phenylacetate (8a)

The crude hydroxy-ester (7a, 0.25 mole) was carefully added to cold thionyl chloride (85 ml.) maintained at 10–15°, and the mixture was set aside overnight. Concentration and distillation of the residue gave a pale-yellow liquid, 45.3 g. (78% from the protected alcohol), B.P. 156–158°/1.5 mm.;

$\gamma_{max.}^{film}$: 1740, 1615, 1580, and 1500 cm.$^{-1}$

NMR ($CDCl_3$): $\tau$ 6.45 (singlet, 2H), 6.33, 6.1–6.4 (singlet and multiplet, total 5H), 5.7–6.0 (multiplet, 2H), and 2.6–3.3 (multiplet, 4H).

Methyl m-(2'-chloroethoxy)phenylacetate (8b)

Reaction of the crude hydroxy-ester (7b, 0.2 mole) and thionyl chloride (75 ml.) as for the p-isomer gave the chloroester, 37.1 g. (81% from the protected alcohol);

$\gamma_{max.}^{film}$: 1750, 1610 and 1590 cm.$^{-1}$

NMR ($CCl_4$): $\tau$ 6.52 (singlet, 2H), 6.37, 6.1–6.5 (singlet and multiplet, total 5H), 5.7–6.0 (multiplet, 2H) and 2.7–3.5 (multiplet, 4H).

Methyl o-(2'-chloroethoxy)phenylacetate (8c)

Reaction of the crude hydroxy-ester (7c, 65.5 g., 0.312 mole) and thionyl chloride (95 ml.) as for the p- and m-isomers gave the chloro-ester, 46.0 g. (63%), B.P. 145°/2 mm.;

$\gamma_{max.}^{film}$: 1740, 1600 and 1585 cm.$^{-1}$ p-(2'-chloroethoxy)phenylacetic acid (9a)

A solution of the chloroethoxy-ester (8a, 41.1 g., 0.18 mole) in 6 N HCl:acetic acid (200:300 ml.) was allowed to stand at room temperature overnight. The mixture was then concentrated and the residue was dissolved in ether. The ethereal solution was washed with water, dried ($MgSO_4$) and concentrated. Addition of hexane to the solid residue and filtration gave a white solid, 36.3 g. (94%), M.P. 100–103°;

$\gamma_{max.}^{Nujol}$: 3300–2500, 1700, 1610, and 1500 cm.$^{-1}$

NMR ($CDCl_3$): $\tau$ 6.42 (singlet, 2H) 6.0–6.4 and 5.6–6.0 (2 multiplets, total 4H), 2.6–3.3 (multiplet, 4H), and 1.42 (singlet, 1H). An analytical sample had M.P. 102–3° (ether).

m-(2'-chloroethoxy)phenylacetic acid (9b)

The chloro-ester (8b, 36 g., 0.158 mole), acetic acid (275 ml.), and 6 N HCl (175 ml.) were left at room temperature overnight. The precipitated acid was collected by filtration, then dissolved in ethyl acetate; the solution was dried (MgSO$_4$/C) and concentrated to give a white solid, 30.1 g., M.P. 110–114°;

$\gamma_{max.}^{Nujol}$: 3300–2500, 1700, 1600, and 1460 cm.$^{-1}$

NMR (acetone-d$_6$) $\tau$ 6.42 (singlet, 2H), 6.0–6.3 (multiplet, 2H), 5.6–5.9 (multiplet, 2H), 2.6–3.3 (multiplet, 4H), and 1.45 (broad singlet, 1H). Concentration of the filtrate gave a second crop, 3.9 g., M.P. 90–100°, whose IR spectrum was essentially the same as that of the first crop. Total yield, 33.1 g. (98%). An analytical sample had M.P. 111–112° (ether-hexane).

o-(2'-chloroethoxy)phenylacetic acid (9c)

The chloro-ester (8c, 44.0 g., 0.19 mole), acetic acid (300 ml.), and 6 N HCl (200 ml.) were stirred at room temperature for 3 days. Work-up as for the p-isomer gave the chloro-acid (9c), 36.5 g. (90%), M.P. 80–83°;

$\gamma_{max.}^{Nujol}$: 3200–2400, 1710 and 1600 cm.$^{-1}$

NMR (CDCl$_3$): $\tau$ 6.40 (singlet) and 6.2–6.5 (multiplet) (total 4H), 5.7–6.0 (multiplet, 2H), 2.7–3.4 (multiplet, 4H), and −1.52 (singlet, 1H). An analytical sample had M.P. 82–83° (ether-hexane).

p-(2'-azidoethoxy)phenylacetic acid (10a)

A mixture of the chloro-acid (9a, 34.3 g., 0.16 mole), sodium azide (20.8 g., 0.32 mole) and sodium iodide (1.5 g.) in DMF-water (250–25 ml.) was stirred and heated at 100° for 2 hours then concentrated. The residue was treated with water, the mixture acidified with 3 N HCl, then extracted with ether. The ethereal solution was dried (MgSO$_4$/C) and concentrated. The solid residue was triturated in hexane and collected by filtration, 34.0 g. (96%), M.P. 73–75°;

$\gamma_{max.}^{Nujol}$: 3100–2500, 2110, 2100 (sh.), 1700, and 1510 cm.$^{-}$

NMR (CDCl$_3$): $\tau$ 6.47 and 6.43 [triplet (J=5 cps.) and singlet, total 4H], 5.89 (triplet, J=5 cps., 2H), 2.6–3.3 (multiplet, 4H), and −1.40 (singlet, 1H). An analytical sample had M.P. 76–77° (ether-hexane).

m-(2'-azidoethoxy)phenylacetic acid (10b)

Reaction of the chloro-acid (9b, 30.0 g., 0.14 mole), sodium azide (18.2 g., 0.28 mole) and sodium iodide (1 g.) in DMF-H$_2$O (200:20 ml.) as for the p-isomer gave 29.4 g. (95%), M.P. 65–69°;

$\gamma_{max.}^{Nujol}$: 3300–2700, 2110, 1710, and 1590 cm.$^{-1}$

NMR (CDCl$_3$): $\tau$ 6.47 and 6.39 [triplet (J=5 cps.) and singlet, total 4H], 5.88 (triplet, J=5 cps., 2H), 2.6–3.4 (multiplet, 4H), and −1.20 (singlet, 1H). An analytical sample had M.P. 70–71° (ether-hexane).

o-(2'-azidoethoxy)phenylacetic acid (10c)

Reaction of the chloro-acid (9c, 35.4 g., 0.165 mole), sodium azide (21.5 g., 0.33 mole), and sodium iodide (1 g.) in DMF:H$_2$O (200:20 ml.) as for the p- and m-isomers gave 34.4 g., M.P. 76–83°. Crystallization from carbon tetrachloride gave 28.8 g. (80%), M.P. 84–87°;

$\gamma_{max.}^{Nujol}$: 3200–2400, 2110, 2070, 1710, 1605 and 1590 cm.$^{-1}$

NMR (CDCl$_3$): $\tau$ 6.31 and 6.2–6.5 (singlet and multiplet, total 4H), 5.88 (triplet, J=5 cps., 2H), 2.6–3.3 (multiplet, 4H), and −0.70 (singlet, 1H). An analytical sample had M.P. 85–86° (ether:hexane).

p-(2'-aminoethoxy)phenylacetic acid (4a)

The azido-acid (10a, 7.2 g., 0.0324 mole) in acetic acid:water (60:30 ml.) was hydrogenated in the presence of 10% Pd/C (1.8 g.) at 14 p.s.i. for 20 hours. The mixture was filtered through "Celite" and the filter cake was washed with warm water (ca. 50°, 125 ml.). The combined filtrate and washings was concentrated, and the residue was dissolved in methanol. Addition of ether precipitated the amino-acid, 4.8 g. (76%) M.P. 178–185° (dec.);

$\gamma_{max.}^{Nujol}$: 3200–2300, 1580 and 1510 cm.$^{-1}$

NMR (TFA): $\tau$ 6.23 and 6.0–6.5 (singlet and multiplet, total 4H), 5.5–5.8 (multiplet, 2H), and 2.3–3.3 (multiplet, 7H). Over several runs, the yields of this reaction varied between 50–80%.

m-(2'-aminoethoxy)phenylacetic acid (4b)

The azido-acid (10b, 17.0 g.) in acetic acid:water (75:45 ml.) was hydrogenated in the presence of 10% Pd/C (6 g.) at 14 p.s.i. for 4 hours. The mixture was filtered through "Celite" and the filtrate was concentrated. The residue was treated with water, and the turbid mixture was extracted with ether. Concentration and lyophilization of the aqueous portion gave the amino acid, 7.75 g. (51.5%):

$\gamma_{max.}^{Nujol}$: 3300–2300, 2150 (weak), and 1560 cm.$^{-1}$

NMR (D$_2$O): $\tau$ 6.55 and 6.5–6.9 (singlet and multiplet, total 4H), 5.7–6.0 (multiplet, 2H), and 2.6–3.4 (multiplet, 4H).

o-(2'-aminoethoxy)phenylacetic acid (4c)

The azido-acid (10c, 5.0 g.) in acetic acid:water (30:20 ml.) was hydrogenated in the presence of 10% Pd/C (1.5 g.) at 10 p.s.i. for 4.5 hours. Work-up as for the m-isomer (9b) gave a gum, which on trituration in ether gave the amino-acid, 3.55 g. (79%);

$\gamma_{max.}^{Nujol}$: 2600 (broad), 2150 (weak), and 1560 cm.$^{-1}$

The NMR spectrum (TFA) was identical to that of the compound prepared according to Scheme I.

p-(2'-N-tert.-butoxycarbonylaminoethoxy) phenylacetic acid (5a)

(a) From the amino-acid hydrochloride.—See Example 1.

(b) From the amino acid (4a) and tert.-butyl 2,4,5-trichlorophenyl carbonate.—See Example 1

(c) From the amino-acid and BOC azide.—The amino-acid (9.6 g., 0.049 mole) and triethylamine (20 g., 0.2 mole) in water (100 ml.) was cooled, then treated with BOC azide (12.9 g., 0.09 mole) in THF (100 ml.). The mixture was stirred at room temperature overnight, concentrated, and the aqueous residue first extracted with ether, then layered with ethyl acetate, cooled and acidified to pH 2.5 with 3 N HCl. The aqueous portion was further extracted with ethyl acetate, and the combined organic portions dried (MgSO$_4$/C) and concentrated to give a solid 9.7 g. (67%) M.P. 97–100°.

The IR spectra of all three samples were identical, and an analytical sample had M.P. 107–108° (ether).

m-(2'-N-tert-butoxycarbonylaminoethoxy)phenylacetic acid (5b)

Reaction of the amino-acid (4b, 7.74 g., 0.0398 mole), triethylamine (15.9 g., 0.159 mole) in water (80 ml.) with BOC azide (11.4 g., 0.0794 mole) in THF (40 ml.) according to the procedure described for the p-isomer (5a) gave a tan solid 10.17 g. (86.5%), M.P. 73–75°;

$\gamma_{max.}^{Nujol}$: 3400, 3300–2500, 1700, 1600, and 1560 cm.$^{-1}$

NMR (CDCl$_3$): $\tau$ 8.57 (singlet, 9H), 6.47 and 6.4–6.7 (singlet and multiplet, total 4H), 6.07 (triplet, J=5 cps., 2H), 2.8–3.4 (multiplet, 4H), and −0.98 (singlet, 1H). An analytical sample had M.P. 76–77°.

o-(2'-N-tert.-butoxycarbonylaminoethoxy)phenylacetic acid (5c)

(a) From the amino acid hydrochloride (3b).—Reaction of the crude amino-acid hydrochloride (4.1 g., estimated purity 30%), triethylamine (9 g., 89 mmoles), and BOC azide in THF:water (30:60 ml.) according to the procedure described for the p-isomer gave 0.8 g., of an oil which slowly solidified, M.P. 99–102°;

$\gamma_{max.}^{Nujol}$: 3300, 3120, 2600 (broad), 1720, 1660 and 1610 cm.$^{-1}$ NMR (acetone-d$_6$): $\tau$ 8.60 (singlet, 9H), 6.52 (triplet, J=5–6 cps., 2H), 6.38 (singlet, 2H), 5.97 (triplet, J=5–6 cps., 2H), 3.90 (broad singlet, 1H) and 2.3–3.3 (multiplet, 5H).

(b) From the amino acid (4c).—Reaction of the amino-acid (3.2 g., 16.4 mmoles), triethylamine (6.56 g., 65 mmoles), and BOC azide in H$_2$O:THF (30:15 ml.) as for the p- and m-isomers gave a white solid, 3 g. (62%), M.P. 105–108°; the IR spectrum was identical to that of the compound obtained in (a). An analytical sample had M.P. 111–112° (CCl$_4$).

SECTION B

Synthesis of o-, m-, and p-[(2'-aminoethoxy)phenylacetamido]-cephalosporanic acids and derivatives The title compounds were normally prepared by the coupling of the 2,4-dinitrophenyl (DNP) ester of the appropriate BOC-amino-acid and the appropriate 7-ACA derivative, followed by removal of the protecting group with cold trifluoroacetic (TFA) acid. These reactions are outlined in Scheme III.

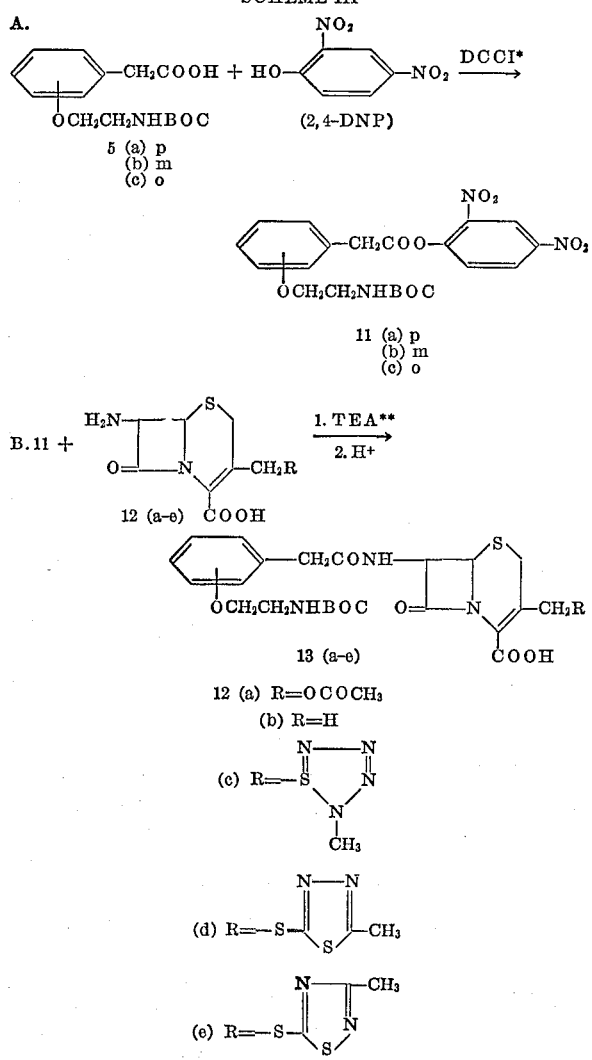

SCHEME III 12 (a) R=OCOCH$_3$
(b) R=H
(c) R=—S—(tetrazole N-CH$_3$)
(d) R=—S—(thiadiazole CH$_3$)
(e) R=—S—(thiazole CH$_3$)

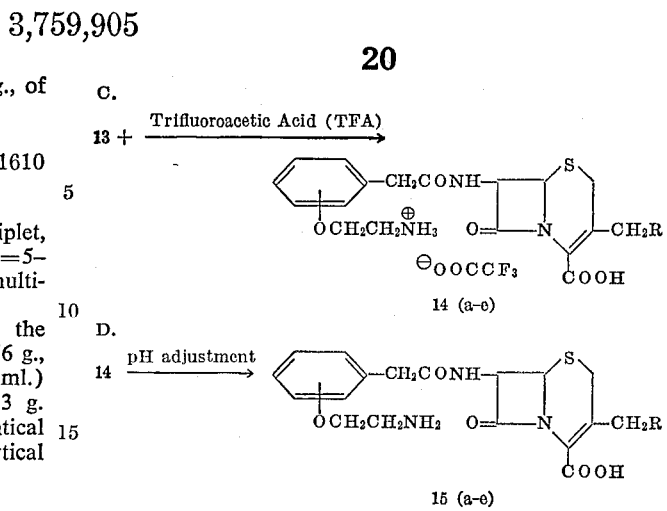

*DCCI=Dicyclohexylcarbodiimide.
**TEA=Triethylamine.

GENERAL PROCEDURE A

Preparation of "active esters" (11)

To a solution of mole equivalents (generally 5–10 mmoles) of the BOC-amino-acid and 2,4-DNP in cold THF or ethyl acetate (ca. 2–3 ml./mmole) was added a mole equivalent of DCCI, and the mixture was set aside at room tempertaure for 1–2 hours. Filtration and concentration of the filtrate yielded the "active ester" in quantitative yield, $\gamma_{max.}^{film}$: 1770–1780

GENERAL PROCEDURE B

Coupling reaction to give (13)

To a cooled solution of the appropriate cephalosporin derivative (generally 5–10 mmoles) and TEA (2 mole equivalents) in CH$_2$Cl$_2$ (5 ml./mmole) was added the "active ester" in CH$_2$Cl$_2$, and the mixture stirred for 1–2 hours. The reaction may be worked up in either of two ways wtih equal success, i.e., (a) addition of ether, and trituration of the precipitate in fresh ether until solid, then dissolving the solid in water. The aqueous solution was washed with ether (or ethyl acetate), layered with ether (or ethyl acetate), cooled and acidified to pH 2–2.5 with 3 N HCl. The aqueous portion was further extracted with the same solvent and the combined organic portions, dried [MgSO$_3$ (and charcoal if necessary)] then concentrated (b). The reaction mixture is concentrated, the residue treated as for the precipitate obtained in (a).

GENERAL PROCEDURE C

Removal of the BOC group

The BOC amino-cephalosporanic acids (13) and cold TFA (5–10 ml./gm.) were stirred at 0° for 1–2 hours. Addition of ether precipitated the trifluoroacetate salts (14).

GENERAL PROCEDURE D

Isolation of the amino-acids (15)

Two procedures were used;

(1)(a) If the trifluoroacetate salt (14) is soluble in water, the solution was adjusted (best with NH$_4$OH since ammonium trifluoroacetate is soluble in methanol) to pH 5.5, concentrated (at <30°) and/or freeze-dried. The residue is treated with cold water (if NaOH is used to adjust pH) or methanol, and the relatively insoluble amino-acid is collected by filtration.

(b) If the trifluoroacetate salt (or free amino-acid) is only partially soluble in water the mixture was adjusted to pH 5–5.5. The insoluble part usually solidified, and filtration gave the free amino acid.

(2) The solution of the trifluoroacetate salt in water (10 ml./gm.) is stirred with liquid ion-exchange resin, Amberlite LA-1 (acetate form, 25% in methylisobutyl ketone, 20 ml./gm.) for 1-2 hours. The aqueous part is further extracted with methylisobutyl ketone, then concentrated and/or freeze-dried.

7-[p-(2'-aminoethoxy)phenylacetamido]cephalosporanic acid

The title cephalosporin was prepared by the coupling of p-(2'-N-tert-butoxycarbonylaminoethoxy)phenylacetyl chloride and 7-ACA (12a), followed by removal of the protecting group with cold trifluoroacetic acid.

BOC Amino acid chloride (V)

See Example 1.

7-[p-(2'-N-tert.-butoxycarbonylaminoethoxy)phenylacetamido]cephalosporanic acid (VI)

See Example 1.

7-[p-(2'-aminoethoxy)phenylacetamido]cephalosporanic acid

See Example 1.

7-[p-(2'-aminoethoxy)phenylacetamido]desacetoxycephalosporanic acid (15b)

The corresponding BOC-amino-acid was coupled to 7-ADCA (12b) using the "mixed anhydride" method, and the protecting group was removed with cold TFA in the usual manner.

7-[p-(2'-N-tert-butoxycarbonylaminoethoxy)phenylacetamido]desacetoxycephalosporanic acid (13b)

A cold solution of the sodium salt of 7-ADCA [from 1.6 g. 7-ADCA (12b, 7.5 mmoles) and NaHCO$_3$ (1.5 g., 18 mmoles) in water (30 ml.)] was added to a cold solution of the "mixed anhydride" from the BOC amino-acid (2.06 g., 7 mmoles), isobutylchloroformate (0.96 g., 7 mmoles), and TEA (0.7 g., 7 mmoles) in THF (25 ml.). The mixture was stirred at 0-5° for 1 hour, at room temperature for 1 hour, then concentrated. The aqueous residue was extracted with ethyl acetate, then layered with ethyl acetate, cooled, and acidified to pH 1 with 3 N HCl. The aqueous portion was further extracted with ethyl acetate and the combined organic portions was dried (MgSO$_4$) and concentrated, yielding a white foam, 0.75 g. (22%);

$\gamma_{max.}^{Nujol}$: 3400-2400, 1770, 1710, and 1660 cm.$^{-1}$

The BOC amino-desacetoxycephalosporanic acid (13b, 0.75 g.) in cold TFA was stirred at 0-5° for 1 hour. Addition of ether and filtration gave a tan colored solid, 0.45 g. (58%);

$\gamma_{max.}^{Nujol}$: 3400-2300, 1770 and 1660 (broad) cm.$^{-1}$

The trifluoroacetate salt (14b, 0.45 g.) was dissolved in water (10 ml.), and the solution was stirred with liquid ion-exchange resin, "Amberlite LA-1" (acetate form, 10 ml., 25% in methylisobutyl ketone) for 2 hours. The aqueous part was washed with methylisobutyleneketone (10 ml.) then freeze-dried. An NMR spectrum of the residue (0.3 g.) indicated the presence of impurities (probably resin), so the material was washed with methanol, then ether giving 0.16 g. 7-[p-(2'-N-tert.-butoxycarbonylaminoethoxy)phenylacetamido] - desacetoxycephalosporanic acid (46%);

$\gamma_{max.}^{Nujol}$: 3300, 3300-2300, 1750 and 1650 cm.$^{-1}$

7-[p-(2'-aminoethoxy)phenylacetamido]-3-[(1-methyl-5-tetrazolylthio)methyl]ceph-3-em-4-carboxylic acid Lot 1.—From the p-BOC amino-acid (1.18 g., 4 mmoles) and 7-amino - 3 - [(1-methyl-5-tetrazolylthio)methyl]ceph-3-em-4-carboxylic acid [12c, U.S. Pat. No. 3,516,997 (June 23, 1970)] reacted according to General Procedures A and B was obtained the BOC-amino-cephalosporanic acid derivative (13c), 1.6 g. (66.5%), 1.6 g.;

$\gamma_{max.}^{Nujol}$: 3300, 2600 (broad), 1770, 1710, and 1510 cm.$^{-1}$

Treatment of (13c) according to General Procedure C gave (14c), 1.35 g. (82.5%);

$\gamma_{max.}^{Nujol}$: 3400-2600, 1780, 1675 and 1510 cm.$^{-1}$

Treatment of (14c) according to Procedure D1(a) gave 0.88 g. (73%);

$\gamma_{max.}^{Nujol}$: 3250, 2700 (broad), 1750, 1650, 1530, and 1510 cm.$^{-1}$ The NMR spectrum indicated the presence of ca. 20% para 15a originating from 7-ACA impurity in the sample of (12c).

Lot 2.—The "active ester" (11a) [from the p-BOC amino-acid (1.5 g., 5.1 mmoles), 2,4-DNP (0.94 g., 5.1 mmoles), and DCCI (1.05 g., 5.1 mmoles)] was added to a solution of 7-amino-3-[1-methyl-5-tetrazolylthio)methyl]ceph-3-em-4-carboxylic acid (12c, 1.64 g., 5.0 mmoles) and triethylamine (1.01 g., 10 mmoles) in CH$_2$Cl$_2$ (15 ml.), and the mixture stirred for 2 hours. Addition of ether gave a precipitate which was redissolved in CH$_2$Cl$_2$ and reprecipitated with ether.

The precipitate was dissolved in methanol and the solution was treated with potassium 2-ethyl hexanoate (2.5 ml., 2.3 M in n-butanol, 5.75 mmoles), then ether. Filtration gave the potassium salt of 13c 1.6 g. (50%).

A solution of the potassium salt in water (50 ml.) was cooled, layered with ethyl acetate (50 ml.) and acidified to pH 3 with 3 N HCl. The aqeuous layer was further extracted with ethyl acetate and the combined ethyl acetate extracts dried (MgSO$_4$) and concentrated to give 13c (1.50 g., 99%).

Treatment of (13c) according to General Procedure C gave (14c), 1.30 g. (73.5%).

The trifluoroacetate salt (14c) was dissolved in water-acetone (15 ml.-15 ml.) and the cooled solution was adjusted to pH 5 with 3 N ammonium hydroxide. Concentration, trituration of the residue in acetone, and filtering gave 7-[p-(2'-aminoethoxy)phenylacetamido]-3-[(1-methyl-5-tetrazolylthio)methyl] - ceph-3-em-4-carboxylic acid, 0.9 g. (98.5%). The IR and NMR spectra were in agreement with the assigned structure, and indicated a purity of at least 90%.

7-[p-2'-aminoethoxy)phenylacetamido] - 3 - [(5-methyl-1,3,4 - thiadiazol - 2 - ylthio)methyl]ceph - 3 - em-4-carboxylic acid From the BOC amino-acid (1.48 g., 5 mmoles) and 12d (1.72 g., 5 mmoles), reacted according to General Procedures A and B was obtained 13d, 1.85 g. (60%);

$\gamma_{max.}^{Nujol}$: 3270, 1780, 1700, 1680, 1650 and 1510 cm.$^{-1}$

Treatment of (13d) according to Procedure C gave 14d, 1.8 g. (95%);

$\gamma_{max.}^{Nujol}$: 3300-2500, 1780, 1700 (sh.), 1670 (broad), and 1510 cm.$^{-1}$ Treatment of 14d according to Procedure D1(b) gave 7-[p-(2'-aminoethoxy)phenylacetamido] - 3 - [(5-methyl-1,3,4 - thiadiazol-2-ylthio)methyl]ceph-3-em-4-carboxylic acid (1.0 g.) and the filtrate yielded a further 0.3 g. Total yield 1.3 g. (88%);

$\gamma_{max.}^{Nujol}$: 3300, 1760, 1660, 1620, 1580, 1530 and 1510 cm.$^{-1}$

The NMR spectrum (TEA) indicated a minimum purity of 85%.

7 - [p - (2'-aminoethoxy)phenylacetamido]-3-[(3-methyl-1,2,4 - thiadiazol - 5 - ylthio)methyl]ceph-3-em-4-carboxylic acid From the BOC amino-acid (1.48 g., 5 mmoles) and 12e (1.77 g., 5.15 mmoles) reacted according to General Procedures A and B was obtained 13e, 2.35 g. (76%);

$\gamma_{max.}^{Nujol}$: 1790, 1700 (broad), 1620, and 1600 cm.$^{-1}$

Treatment of (13e) according to the Procedure C gave 14e, 1.8 g. (75%);

$\gamma_{max.}^{Nujol}$: 1780, and 1680 cm.$^{-1}$

Treatment of 14e (1.8 g.) according to General Procedure D1(b) gave 7 - [p - (2'aminoethoxy)phenylacetamido] - 3 - [(3-methyl-1,2,4-thiadiazol-5-ylthio)methyl]ceph-3-em-4-carboxylic acid, 0.9 g. (61%).

$\gamma_{max.}^{Nujol}$: 3300, 1750, 1660, 1610, 1530 and 1510 cm.$^{-1}$

The NMR spectrum (TFA) indicated a purity of approximately 80%.

m SERIES

7-[m-(2'-aminoethoxy)phenylacetamido]cephalosporanic acid

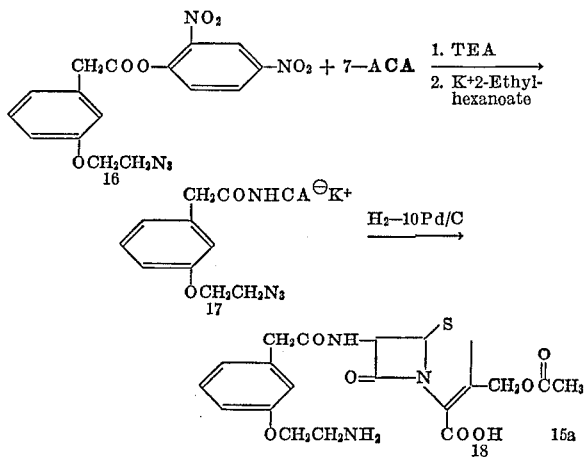

The 2,4-DNP ester of m-(2'-azidoethoxy)phenylacetic acid (18 mmoles, prepared according to Procedure A) and 7-ACA (4.9 g., 18 moles) were reacted according to Procedure B. Filtration of the reaction mixture and addition of ether to the filtrate gave a gummy precipitate, which was dissolved in CH$_2$Cl$_2$ and reprecipitated with ether (twice). The final precipitate was redissolved in methanol (50 ml.), and the solution treated with potassium 2-ethylhexanoate (7.6 ml., 2.3 M, 17.5 mmoles), then ether. Filtration gave 7.1 g. 17 (77%);

$\gamma_{max.}^{Nujol}$: 3300, 2110, 1770, 1740 (sh.), 1660, 1620 and 1560 cm.$^{-1}$ indicated a minimum purity of 85%.

The potassium azido-cephalosporanate (17) (6.6 g.) in 5% aqueous methanol (350 ml.) was reduced over 10% Pd/C (2.6 g.) by bubbling a stream of hydrogen through the reaction mixture for 45 minutes. Filtration of the reaction mixture through "Celite," and concentration of the filtrate gave a residue, which was dissolved in water. The aqueous solution was cooled, acidified to pH 2 with 6 N HCl, and filtered. The filtrate was taken to pH 5 with 3 N NaOH, then concentrated, and the residue treated with cold water and filtered to give 7-[m-(2'-aminoethoxy)phenylacetamido]cephalosporanic acid (18), 1.5 g. (26%);

$\gamma_{max.}^{Nujol}$: 3250, 1760, 1650, 1580, and 1530 cm.$^{-1}$

The NMR spectrum (TFA) was in agreement with the assigned structure and indicated a minimum purity of 80%.

7-[m-(2'-aminoethoxy)phenylacetamido]-3-[(1-methyl-5-tetrazolylthio)-methyl]ceph-3-em-4-carboxylic acid From the BOC amino-acid (1.48 g., 5 mmoles) and 12c (1.65 g., 5 mmoles) reaction according to the General Procedures A and B was obtained the BOC-amino cephalosporanic acid derivative (13c) 1.3 g. (43%);

$\gamma_{max.}^{Nujol}$: 3300, 1780, and 1700 (broad) cm.$^{-1}$

Treatment of (13c) according to Procedure C gave 14c, 1.15 g. (86%);

$\gamma_{max.}^{Nujol}$: 1780, 1675 and 1620 (broad) cm.$^{-1}$

Treatment of 14c according to Procedure D1(a) gave a residue which was dissolved in methanol and ether added to precipitate 0.8 g. of 7-[m-(2'-aminoethoxy)phenylacetamido] - 3-[(1-methyl-5-tetrazolylthio)methyl]ceph-3-em-4-carboxylic acid (85%);

$\gamma_{max.}^{Nujol}$: 3300–2300, 1775, 1670 and 1600 cm.$^{-1}$

The NMR (TFA) spectrum indicated a minimum purity of 75%.

7 - [m-(2'-aminoethoxy)phenylacetamido]-3-[(5-methyl-1,3,4 - thiadiazol - 2 - ylthio)methyl]cept - 3 - emboxylic acid From the BOC amino-acid (1.48 g., 5 mmoles) and 12d (1.72 g., 5 mmoles) reacted according to the General Procedures A and B was obtained the BOC amino cephalosporanic acid derivative (13d), 2.3 g. (74%).

Treatment of 13d (2.3 g.) according to Procedure C gave 14d, 1.85 g. (79%);

$\gamma_{max.}^{Nujol}$: 1780 and 1675 (broad) cm.$^{-1}$

Treatment of 14d according to Procedure D1(a) gave 7 - [m - (2' - aminoethoxy)phenylacetamido]-3-[(5-methyl - 1,3,4 - thiadiazol-2-ylthio)methyl]ceph-3-em-4-carbovylic acid, 1.1 g. (72%);

$\gamma_{max.}^{Nujol}$: 1760, 1640, and 1550 cm.$^{-1}$

The NMR spectrum (TFA) indicated a minimum purity of 80%.

7 - [m-(2'-aminoethoxy)phenylacetamido]-3-[(3-methyl-1,2,4 - thiadiazol - 5 - ylthio)methyl]ceph-3-em-4-carboxylic acid From the BOC amino-acid (1.48 g., 5 mmoles) and 12e (1.77 g., 5.15 mmoles), reacted according to the General Procedures A and B, was obtained the BOC amino-cephalosporanic acid derivative (13e) 1.47 g., (47%);

$\gamma_{max.}^{Nujol}$: 3300–2300, 1760, and 1680 (broad) and 1520 cm.$^{-1}$

Treatment of (13e) according to Procedure C gave 14e, 1.4 g., (93%);

$\gamma_{Max.}^{Nujol}$: 3300–2300, 1760, and 1670 cm.$^{-1}$

Treatment of 14e according to Procedure D1(b) gave 7 - [m-(2'-aminoethoxy)phenylacetamido]-3-[(3-methyl-1,2,4 - thiadiazol-5-ylthio)methyl]ceph-3-em-4-carboxylic acid 0.98 g. (85%);

$\gamma_{max.}^{Nujol}$: 3400–2500, 1760, 1650, 1600 and 1540 cm.$^{-1}$

The NMR spectrum (TFA) indicated a purity of 90%.

o SERIES

7-[0-(2'-aminoethoxy)phenylacetamido]cephalosporanic acid

From the BOC amino-acid (1.32 g., 4.5 mmoles) and 7-ACA (12a, 1.35 g., 4.95 mmoles), reacted according to the General Procedures A and B was obtained the BOC aminocephalosporanic acid derivative (13a) as an amorphous foam 2.7 g. (100%);

$\gamma_{max.}^{Nujol}$: 1780, 1750 and 1600 cm.$^{-1}$

Treatment of 13a according to General Procedure C gave 14a, 1.3 g. (51%);

$\gamma_{max.}^{Nujol}$: 1780, 1725, and 1675 cm.$^{-1}$

The NMR spectrum (TFA) was in agreement with the assigned structure, and indicated a purity of about 90%.

Treatment of 14a according to General Procedure D2 gave on centrifugation of the water-resin mixture, an intermediate layer of a fine solid, which was isolated and washed with methanol then ether yielding 7-[0-(2'-aminoethoxy)phenylacetamido]cephalosporanic acid as a tan powder, 0.65 g. (62%);

$\gamma_{max.}^{Nujol}$: 3400, 1780, 1660 and 1630 cm.$^{-1}$

The NMR spectrum (TFA:D₂O) was in agreement with the assigned structure and indicated a purity of 80%.

7-[0-(2'-aminoethoxy)phenylacetamido]cephalosporanic acid hydrochloride

To a suspension of 7-[0-(2'-aminoethoxy)phenylacetamido]cephalosporanic acid (0.2 g.) in cold methanol (5 ml.), concentrated HCl was added in small droplets until all the solid dissolved. Addition of ether and filtration gave 0.2 g. of an off-white powder;

$\gamma_{max.}^{Nujol}$: 1780, 1740 and 1660 cm.⁻¹

The NMR spectrum (D₂O) was in agreement with the assigned structure and indicated a purity of 80%.

SECTION C

7-[p-(2'-aminoethoxy)phenylacetamido]-3-pyridiniummethyl)ceph-3-em-4-carboxylate See Example 2.

7-[m-(2'-aminoethoxy)phenylacetamido]-3-(pyridiniummethyl)ceph-3-em-4-carboxylate Potassium 7-[m-(2'-N-tert.-butoxycarbonylaminoethoxy)phenylacetamido]cephalosporanate The 2,4-DNP ester [2,4-dinitrophenyl m-(2'-N-tert.-butoxycarbonylaminoethoxy)phenylacetate] (13 mmoles) and 7-ACA (13 mmoles) were reacted according to the procedure described for the p-isomer, yielding potassium 7 - [m - (2' - N - tert. - butoxycarbonylaminoethoxy) phenylacetamido]-cephalosporanate, 5.5 g. (72%);

$\gamma_{max.}^{Nujol}$: 3270, 1760, 1710, 1650 and 1600 cm.⁻¹

7-[m-(2' - N - tert.-butoxycarbonylaminoethoxy)phenylacetamido]-3-picolinoyl-thiomethyl)ceph - 3 - em - 4-carboxylic acid The potassium 7-[m-(2' - N - tert. - butoxycarbonylaminoethoxy)phenylacetamido]cephalosporanate (5.5 g., 9.4 mmoles) and thiopicolinic acid (2.74 g., 19.7 mmoles) reacted as for the p-isomer gave 4.0 g. (69%) 7 - [m - (2' - N - tert. - butoxycarbonylaminoethoxy) phenylacetamido] - 3 - picolinoyl-thiomethyl)ceph-3-em-4-carboxylic acid;

$\gamma_{max.}^{Nujol}$: 3300, 1780, 1710, 1680 (sh.), 1650, 1590 and 1530 cm.⁻¹

7 - [m - (2' - N - tert. - butoxycarbonylaminoethoxy) phenylacetamido] - 3 - (pyridiniummethyl)ceph-3-em-4-carboxylate The 7 - [m - (2' - tert. - butoxycarbonylaminoethoxy) phenylacetamido] - 3 - picolinoylthiomethyl)ceph-3-em-4-carboxylic acid (3.0 g., 4.8 mmoles) and mercuric perchlorate-pyridine complex (6.7 g. 12 mmoles) were reacted as described for the p-isomer yielding 7-[m-(2'-N-tert.-butoxycarbonylaminoethoxy)phenylacetamido] - 3 - (pyridiniummethyl)ceph-3-em-4-carboxylate as a brown foam, 2.3 g. (85%);

$\gamma_{max.}^{Nujol}$: 1780, 1110, 1670 (broad), 1600, and 1520 cm.⁻¹

7 - [m - (2' - aminoethoxy)phenylacetamido] - 3 - pyridiniummethyl)ceph - 3 - em - 4 - carboxylic acid di(trifluoroacetate)

The BOC cephalosporin derivative (7 - [m - (2' - N-tert. - butoxycarbonylaminoethoxy)phenylacetamido] - 3-(pyridiniummethyl)ceph - 3 - em - 4 - carboxllate, 2.3 g., 4 mmoles) was treated with TFA at 0° for 1 hour. Addition of ether gave 7-[m-(2' - aminoethoxy)phenylacetamido] - 3 - (pyridiniummethyl)ceph - 3 - em - 4-carboxylic acid di(trifluoroacetate), 1.9 g. (80%);

$\gamma_{max.}^{Nujol}$: 1790 and 1680 (broad) cm.⁻¹

7-[m-(2'-aminoethoxy)phenylacetamido]-3-(pyridiniummethyl)ceph-3-em-4-carboxylate Isolation of the free pyridinium amino-acid from the above trifluoroacetate salt (1.9 g.) as described for the p-isomer gave 1.25 g. 7 - [m - (2' - aminoethoxy)phenylacetamido] - 3 - (pyridiniummethyl)ceph - 3 - em - 4-carboxylate (87%);

$\gamma_{max.}^{Nujol}$: 1780, 1680 and 1620 cm.⁻¹

The NMR spectrum (D₂O) was in agreement with the assigned structure and indicated a minimum purity of 90%.

We claim:

1. A compound having the formula

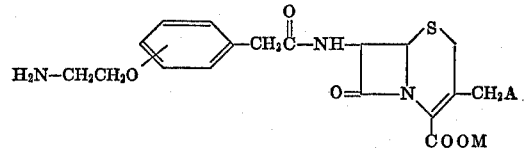

wherein A is hydrogen, acetoxy, 5-methyl-1,3,4-thiadiazol-2-ylthio, 1 - methyl - 5 - tetrazolylthio, 3-methyl-1,2,4-thiadiazol - 5 - ylthio, pyridinium, picolinium or lutidinium; and M is hydrogen, a pharmaceutically acceptable, nontoxic cation or an anionic charge when A is one of said quaternary ammonium radicals.

2. A compound of claim 1 wherein A is pyridinium.

3. A compound having the formula

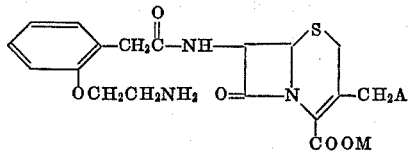

wherein A is hydrogen, acetoxy, 5 - methyl - 1,3,4 - thiadiazol - 2 - ylthio, 1-methyl - 5 - tetrazolylthio, 3-methyl-1,2,4-thiadizol - 5 - ylthio, pyridinium, picolinium or lutidinium; and M is hydrogen, a pharmaceutically acceptable, nontoxic cation or an anionic charge when A is one of said quaternary ammonium radicals.

4. The compound of claim 3 wherein A is pyridinum.
5. The compound of claim 3 wherein A is hydrogen.
6. The compound of claim 3 wherein A is acetoxy.
7. The compound of claim 3 wherein A is 5-methyl-1,3,4-thiadiazol-2-ylthio.
8. The compound of claim 3 wherein A is 1-methyl-5-tetrazolylthio.
9. The compound of claim 3 wherein A is 3-methyl-1,2,4-thiadiazol-5-ylthio.
10. The compound of claim 3 wherein A is picolinium.
11. A compound of claim 3 wherein A is lutidinium.
12. A compound having the formula

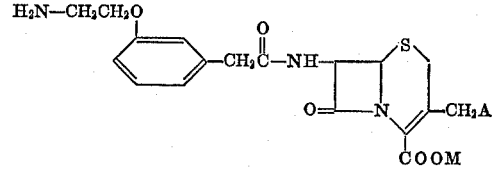

wherein A is hydrogen, acetoxy, 5-methyl-1,3,4-thiadiazol-2-ylthio, 1-methyl-5-tetrazolylthio, 3-methyl-1,2,4-thiadiazol-5-ylthio, pyridinium, picolinium or lutidinium; and M is hydrogen, a pharmaceutically acceptable, notoxic cation or an anionic charge when A is one of said quaternary ammonium radicals.

13. The compound of claim 12 wherein A is pyridinium.
14. The compound of claim 12 wherein A is hydrogen.
15. The compound of claim 12 wherein A is acetoxy.
16. The compound of claim 12 wherein A is 5-methyl-1,3,4-thiadiazol-2-ylthio.
17. The compound of claim 12 wherein A is 1-methyl-5-tetrazolylthio.
18. The compound of claim 12 wherein A is 3-methyl-1,2,4-thiadiazol-5-ylthio.
19. A compound of claim 12 wherein A is picolinium.
20. A compound of claim 12 wherein A is lutidinium.

21. A compound having the formula

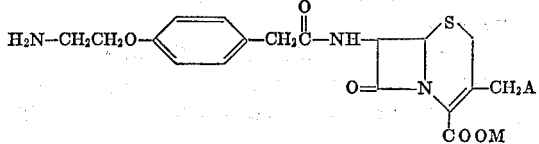

wherein A is hydrogen, acetoxy, 5-methyl-1,3,4-thiadiazol-2-ylthio, 1-methyl-5-tetrazolylthio, 3-methyl-1,2,4-thiadiazol-5-ylthio, pyridinium, picolinium or lutidinium; and M is hydrogen, a pharmaceutically acceptable, non-toxic cation or an anionic charge when A is one of said quaternary ammonium radicals.

22. The compound of claim 21 wherein A is pyridinium.
23. The compound of claim 21 wherein A is hydrogen.
24. The compound of claim 21 wherein A is acetoxy.
25. The compound of claim 21 wherein A is 5-methyl-1,3,4-thiadiazol-2-ylthio.
26. The compound of claim 21 wherein A is 1-methyl-5-tetrazolylthio.
27. The compound of claim 21 wherein A is 3-methyl-1,2,4-thiadiazol-5-ylthio.
28. A compound of claim 21 wherein A is picolinium.
29. A compound of claim 21 wherein A is lutidinium.

References Cited
UNITED STATES PATENTS
3,641,021    2/1972    Ryan _____ 260—243 C NICHOLAS S. RIZZO, Primary Examiner U.S. Cl. X.R.
424—246